April 7, 1953     W. R. MILLER     2,633,914
CONTROL DEVICE
Filed Feb. 2, 1945     3 Sheets-Sheet 1
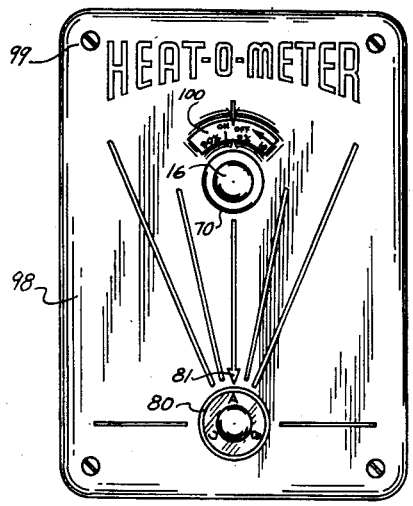
Fig.1
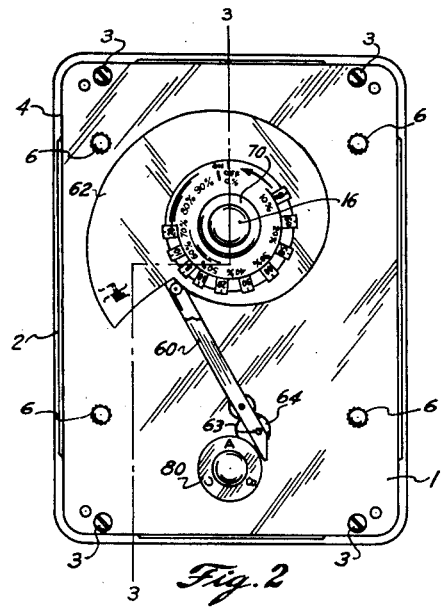
Fig.2
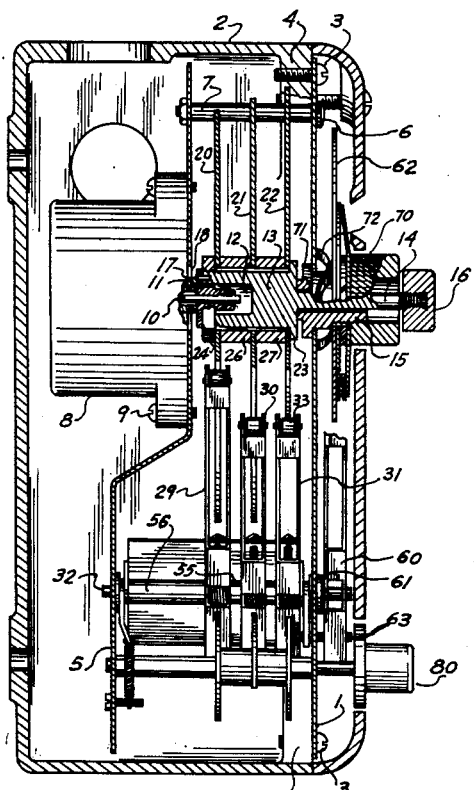
Fig.3
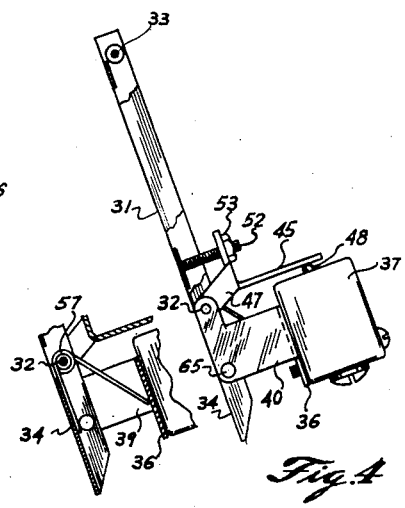
Fig.4
Fig.5
INVENTOR.
Wayland R. Miller
BY Mason & Harfield April 7, 1953 W. R. MILLER 2,633,914
CONTROL DEVICE
Filed Feb. 2, 1945 3 Sheets-Sheet 2
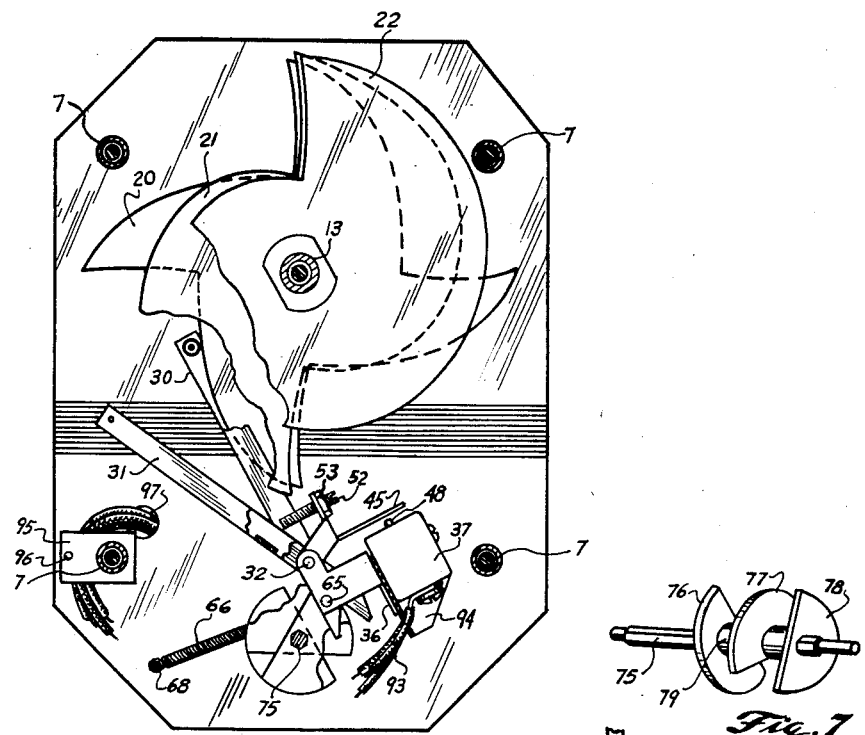
Fig. 6
Fig. 7
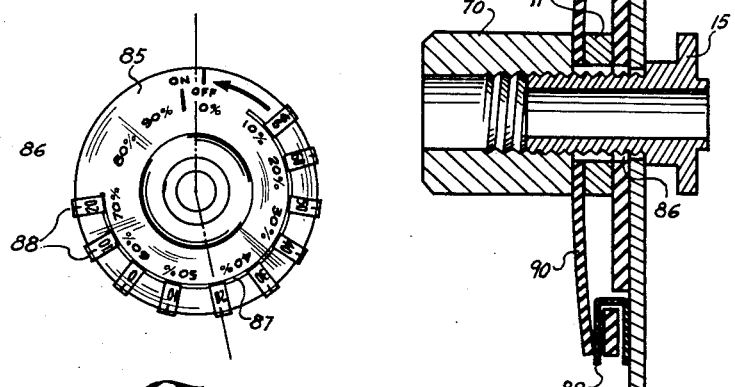
Fig. 8
Fig. 9
INVENTOR.
Wayland R. Miller
BY Mason & Hatfield April 7, 1953 W. R. MILLER 2,633,914
CONTROL DEVICE Filed Feb. 2, 1945 3 Sheets—Sheet 3

INVENTOR.
Wayland R. Miller
BY Mason & Hatfield

Patented Apr. 7, 1953

2,633,914

UNITED STATES PATENT OFFICE 2,633,914

CONTROL DEVICE

Wayland R. Miller, Milwaukee, Wis.

Application February 2, 1945, Serial No. 575,880

10 Claims. (Cl. 161—1)

This invention relates to timing devices and to automatic controls for controlling stokers or oil burners in multi-occupancy buildings.

The invention has among its objects to provide a simple, rugged and dependable controller that may be set to various outside temperature settings and which operates a stoker or oil burner the proper percentage of time to maintain even building temperatures.

Another object of the invention is to provide a manually adjustable control with a readily adjustable scale for its manual adjusting knob or lever, this adjustable scale permitting the control to be matched with the characteristics of the system it controls.

Still another object of the invention is to provide a flexible timing device which determines the percentage of time the burner operates and also which provides for varying the frequency that the burner operates, independently of the percentage of time.

A further object of the invention is to provide a simple time control device for controlling a burner on a steam heating system and which stops and starts the burner at intervals providing the proper percentage of time of operation to heat the building, and in which the duration of each "on" period is long enough to insure proper distribution of steam in the system.

Another object of the invention is to provide a time cycle control in which movement of one accessible adjusting member varies percentage of time and in which movement of another accessible adjusting member varies the frequency of the time cycles.

Other objects of the invention will appear from the following description.

In the drawings,

Fig. 1 is an external front elevation of the control device;

Fig. 2 is a view similar to Fig. 1 with the front cover removed;

Fig. 3 is a side elevation, partly in section, taken on line 3—3 of Fig. 2;

Fig. 4 is a front view of the cam follower and switch assembly;

Fig. 5 is a fragmentary view similar to Fig. 4, but showing the cam follower spring construction;

Fig. 6 is a front elevation of the control mechanism with the front plate removed;

Fig. 7 is a perspective view of the selector cam shaft assembly;

Fig. 8 is an enlarged front view of the adjusting knob scale construction;

Fig. 9 is an enlarged side sectional view of the adjustable scale construction.

Figure 10:
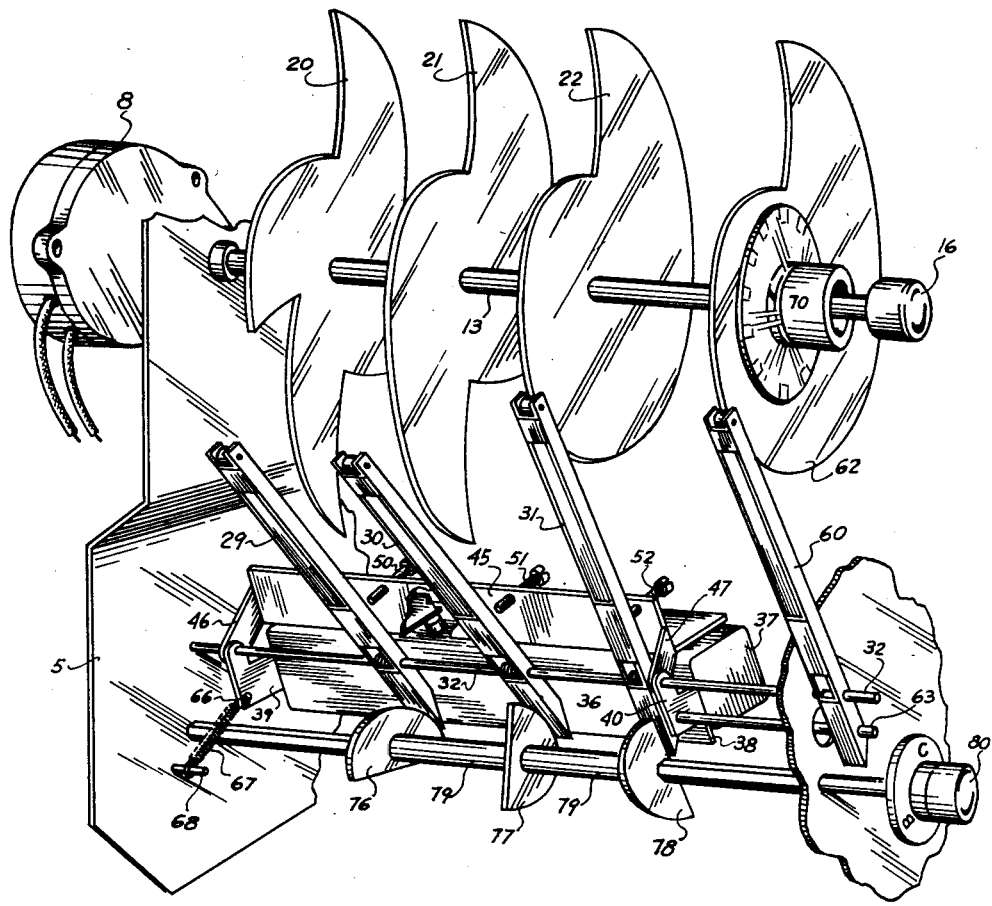
Fig. 10 is a schematic perspective view.

Referring in particular to Figs. 2 and 3, reference character 1 indicates a front or mounting plate which is secured to the front face of a case 2 by means of screws 3. The case is shown as being provided with corner bosses 4, one boss being at each corner and being tapped to receive screw 3. Located within the case rearwardly of the front plate 1 is a back plate 5. In the construction illustrated, the back plate 5 is off-set so as to provide a relatively large space between the front and back plates at the lower portion of the instrument, and a relatively narrow space between these plates at the upper portion thereof. The back plate is secured to the front plate by means of screws 6, these screws extending through spacers 7, which serve to maintain a predetermined spacing between these plates.

Mounted on the back plate is a synchronous motor and gear train unit 8, this motor being secured to the back plate by screws 9. A drive shaft 10 extends from the motor into the space between the plates. Pressed into the drive shaft 10 is a drive shaft bushing 11, this bushing extending into the recess 12 of a main cam shaft 13. This cam shaft is provided with a reduced extension 14 which rides in a bearing 15 carried by the front plate. The end of the extension 14 is threaded to receive a cycling knob 16. The main cam shaft 13 is driven by the drive bushing 11 by means of a pin 17 which is pressed into the cam shaft and which loosely fits in a hole in the drive bushing. It should be noted that the back plate is provided with a hole 18 which is of larger diameter than the flange on the drive bushing. This arrangement permits the drive bushing to be pressed on the motor shaft before the motor is mounted on the back plate. This arrangement also permits easy removal and replacement of the motor.

Mounted on the main cam shaft are a series of cams 20, 21, and 22. These cams are held in place on the cam shaft by means of a flange 23 at the right hand end of the cam shaft, and a nut 24 which is threaded onto the left hand end of the shaft. The cams are maintained in spaced relationship by means of annular spacers 26 and 27. From the description thus far it will be seen that the synchronous motor unit 8 serves to drive the cams 20, 21 and 22 at a predetermined constant speed.

The cams 20, 21, and 22 are provided with separate cam followers 29, 30, and 31 respectively.

These cam followers are carried by a cam follower shaft 32. This shaft extends between the front and back plates and also extends a short distance in front of the front plate. The cam followers are identical in construction and are each formed as a U-shaped channel. At their upper ends the cam followers are provided with rollers 33 which roll upon the cams as the latter rotate. The mounting holes for the cam followers on the shaft 32 are located intermediate the ends of the followers, thus providing lower extensions 34. The purpose of these lower extensions on the cam followers will become clear as the description proceeds.

Also mounted on the shaft 32 is a switch carrier 36 which serves to support an enclosed snap switch 37. As shown more clearly in Fig. 10, the switch carrier 36 is formed as a plate having rearwardly and upwardly extending ears 39 and 40, these ears at their upper ends having openings for receiving the shaft 32. Also carried on the shaft 32 is a switch actuator 45. This actuator is formed as an L-shaped bracket having rearwardly and downwardly extending ears 46 and 47 (Fig. 10). One leg of the L-shaped bracket extends out over the enclosed snap switch 37 so as to engage the plunger 48 thereof. The other leg of the switch actuator carries calibrating screws 50, 51, and 52 which are adapted to be engaged by cam followers 29, 30, and 31 respectively. Each calibrating screw is provided with a lock nut 53. As shown in Fig. 3, the ears of the switch carrier 36 are adjacent to the front and back plates but are spaced slightly therefrom by means of spacing washers. The ears of the switch actuator are adjacent the ears of the switch carrier. The front cam follower 31 is adjacent the ear 47 of the switch actuator, and the cam followers are held in correct spaced relationship by means of spacers 55. The set of cam followers are prevented from moving toward the back plate by means of an elongated spacer 56 which is mounted on the shaft 32. As shown more clearly in Fig. 5, each cam follower is provided with a torsion spring 57. Each spring 57 surrounds the shaft 32 between the legs of the channel-shaped cam follower. One arm of the spring rests against the switch carrier 36 and the other arm is thereby forced against the back of the cam follower. This arrangement serves to separately bias each cam follower toward its respective cam.

In order to control the percentage of time that the snap switch 37 is open and closed, the cam follower and switch assembly is rotatable as a unit about the shaft 32. To this end an adjusting cam follower 60 is mounted at the front of the front plate on the forwardly extending portion of the shaft 32. Preferably the cam follower is spaced from the front plate by means of a washer 61. The adjusting cam follower 60 rides upon an adjusting cam 62 which is mounted on the same axis as the cams 20, 21, and 22. The adjusting cam is arranged to drive the switch carrier 40 by means of a pin 63 which extends through an opening 64 in the front plate and into an opening 65 formed in the switch carrier. The other ear 39 of the switch carrier is provided with a similar opening 66 which receives one end of a spring 67. The other end of this spring is secured to a stud 68 carried by the back plate 5. An inspection of Fig. 10 will indicate that the spring 67 biases the switch carrier 36 in a clockwise direction. This in turn biases the adjusting cam follower 60 against the adjusting cam 62. Thus rotation of the adjusting cam 62 serves to rotate the snap switch assembly about the shaft 32 as an axis.

The adjusting cam 62 is adjustable from outside the casing by means of a knob 70. This cam is mounted on the bearing 15 which receives the extension 14 of the main cam shaft. This bearing is provided with a flange 71 located at the rear of the front plate. This member extends through the front plate and is formed with a shoulder spaced from the plate against which the adjusting cam 62 is forced by the knob 70 which is screw-threaded to the exterior of the bearing. A friction spring 72 is located between the front plate and the adjusting cam. This friction spring serves the dual function of providing friction and resisting movement of the cam 62, and of forcing the cam 62 outwardly so that the flange 71 is forced against the rear of the front plate. This arrangement serves to maintain the bearing 15 perpendicular to the front plate while permitting rotation thereof.

In normal operation it is desired to permit only one of the motor driven cams and cam followers to actuate the switch. This result is obtained by means of the selector cam assembly which is shown in Fig. 7. This assembly consists of a selector cam shaft 75 which carries three selector cams 76, 77, and 78. These selector cams are maintained in spaced relationship by means of spacers 79 located on the shaft 75 between the cams. These cams are of semicircular configuration and are mounted on the selector shaft 75 at angles 120° apart. Preferably the selector shaft 75 is hexagonal in shape and the openings in the cams are likewise hexagnoal. This permits ready assembly and insures that the correct angular relationship between the cams will be maintained. The ends of the shaft 75 are turned down to circular configuration and serve as bearings for mounting the shaft between the plates 5 and 6. As shown in Figs. 3 and 10, the shaft extends through the front plate and is attached to a knob 80 which projects through the cover so as to be accessible from the front of the instrument. As shown in Fig. 1, this knob is provided with indicia "A," "B," and "C" for cooperating with a pointer 81 on the cover for indicating the angular adjustment of the shaft. As shown in Fig. 10, the cams 76, 77, and 78 are arranged to cooperate with the lower extensions of the cam followers. With the shaft in the position shown, the cams 76 and 77 have their circular portions in engagement with the cam followers 29 and 30. This forces these cam followers clear of their respective cams and also forces these cam followers away from the switch actuator 45 so that these cam followers have no effect on the switch actuator. The cam 78 is positioned with its flat portion facing the cam follower 31. This flat portion does not engage the cam follower 31 and thus this cam follower is permitted to be forced against the cam 22 by its biasing spring 57 (Fig. 5). As the cam 22 is rotated in a clockwise direction by the motor 8, the cam follower 31 will complete the cycle once for each revolution of the cam. Thus with the parts in the positions shown, the snap switch 37 will be opened and closed once for each revolution of the main cam shaft. If the knob 80 is now turned to the position "B," the circular portion of the cam 77 will disengage the cam follower 30 and the circular portion of cam 78 will engage the cam follower 31 while the circular portion of cam 76 remains engaged with the cam follower 29. This will cause the cam followers 29 and 31 to be held away from their respective cams while freeing the cam follower 30 for actuation by the cam 21. The cam 21 is provided with two rises and falls. Thus upon rotation of this cam the cam follower 30 will be actuated through two complete cycles for each revolution of the cam 21. Therefore when the knob 80 is on the "B" position the snap switch 37 will be opened and closed twice for each revolution of the main cam shaft. When the adjusting knob 80 is turned to the "A" position the cam 76 will disengage the cam follower 29 while the cams 77 and 78 will force the cam followers 30 and 31 from their respective cams. Cam 20 is provided with four rises and falls, and will thus cause the cam follower 29 to traverse four complete cycles for each revolution of this cam. Therefore when the knob 80 is turned to the "A" position the snap switch 37 will be opened and closed four times for each revolution of the main cam shaft. It will now be apparent that the knob 80 serves to select which cam and cam follower actuates the snap switch. As each cam is designed to give a different frequency of operation, rotation of the knob 80 serves to determine the frequency of operation of the snap switch.

As pointed out previously, rotation of the adjusting cam 62 serves to move the snap switch 37 about the shaft 32 as a pivot. This serves to vary the percentage of time that the switch 37 is closed. With the arrangement shown, the snap switch is held open by the actuator 45 holding the snap switch plunger 48 in depressed position. Assuming that the cam follower 31 is operative, its spring will force it against the calibrating screw 52 and thus hold the switch actuator in depressed position as long as the cam follower is not engaged by the cam 22. When the cam 22 engages the cam follower 31 and forces it in a counterclockwise direction, this releases the switch actuator 45 which in turn permits the switch plunger 48 to move outwardly for closing the switch. As the cam continues to rotate, the switch will remain in open position until the cam follower drops off the top of the cam to the bottom thereof. At this time the cam follower 31 will be forced inwardly by its spring and thus force the switch actuator 45 against the switch plunger for opening the switch. The switch will now remain in open position during the portion of rotation of the cam 22 until it again engages the cam follower. Rotation of the adjusting cam and the resulting bodily movement of the switch 37 determine the portion of each revolution of the cam that the switch is closed. For example, if the adjusting cam 62 is turned to its clockwise limit of rotation the switch 37 and the cam follower 31 will be carried to a position in which the cam follower is never engaged by the cam 22 as it rotates. Thus the switch actuator 47 is forced against the plunger 48, thereby holding the switch open during the entire revolution of cam 22. This provides an "off" position of the adjusting knob. If the adjusting cam 62 is rotated to its counter-clockwise limit of rotation the switch 37 will be carried to a position in which the plunger 47 does not open the switch even when the cam follower 31 is at the bottom of cam 22. This provides an "on" position for the adjusting knob 70. If the adjusting cam is set at various intermediate positions the switch will be opened and closed at intervals varying in proportion with the angular position of the cam 62. Due to the uniform rise in cams 22 and 62, a straight-line relationship is provided.

The cams 20, 21, and 22 are designed so that their throws are substantially the same. With this arrangement the percentage of operation as set by the adjusting cam 62 will remain the same, regardless of which cam and cam follower is used for operating the switch.

As stated before, the primary purpose of the present invention is to control the supply of heat to multi-occupancy buildings. In such buildings it is a known fact that the amount of heat supplied varies in accordance with outside temperature. In other words, the colder it gets outside, the greater the percentage of operation that is required of the oil burner or stoker in order to maintain the building at the desired temperature. This relationship between percentage of operation and outside temperature is theoretically a straight-line function. In practice, however, this straight-line relationship does not hold true, due to the fact that the efficiency of the system drops off in milder weather. It is thus impractical to provide a straight-line scale between outside temperature and percentage of operation. In addition, the characteristics of different buildings are quite different. For example, in one installation it may be found that 50% operation of the burner will maintain the building up to temperature when outside temperature is at zero, while in another building it may be necessary to operate the burner 60% of the time at this same outside temperature. It is therefore necessary to make provision for adjusting the control so that its characteristics match the characteristics of the particular installation in which it is located. The present invention obtains this result by means of the adjustable scale shown in Figs. 2, 8, and 9. This adjustable scale in the present embodiment of the invention consists of a circular scale plate 85 which is mounted on the adjusting cam 62, this scale plate being provided with a central opening 86 through which the bearing member 15 extends. This scale plate is provided with an arcuate slot 87 which receives a series of U-shaped tabs 88. These tabs extend through the slot so that one leg is located behind the scale plate while the other leg is located in front. This arrangement permits the tabs 88 to be shifted around the periphery of the scale plate, but prevents these tabs from becoming disengaged from the scale plate. Preferably a bezel or transparent cover 90 is provided to cover the dial and the adjustable tabs. The tabs extend slightly beyond the cover and the scale plate so that they may be engaged by the fingers for shifting thereof. The bezel 90 is preferably of bowed configuration of a transparent flexible plastic. This bowed configuration serves to apply tension to the tabs for holding them in place. The bezel 90 is held in place by the knob 70 and a washer 91 is located between the bezel and scale plate in order to maintain the bowed configuration of the bezel.

Due to the switch 37 being bodily movable, it is necessary to provide flexible leads 93 (Fig. 6) to this switch. These leads are secured adjacent the switch by passing them through closely fitting holes in an insulating spacer 94. These leads extend downwardly past the shaft 75 and the stud 68 and then extend upwardly to a wiring clamp 95 which surrounds the spacer 7. This wiring clamp clamps the wires between the back plate and the clamp, the clamp being forced toward the back plate by a screw 96. The wires after being clamped extend through a hole 97 in the back plate.

As shown in Fig. 1, a cover 98 is provided for covering the front plate of the instrument. This cover is held in place by screws 99. This cover is provided with openings through which the knobs 70 and 80 extend. The cover is also provided with a window 100 through which the scale plate may be viewed.

It will be noted that the scale plate is provided with two separate scales. One scale shows percentage of operation for different positions of the adjusting knob 70. The other scale is an outdoor temperature scale and is carried by adjustable tabs. In use the operator observes the outside temperature and then moves the knob 70 until the corresponding outside temperature numeral is under the pointer carried by the cover. This sets the control so as to maintain the proper percentage of operation for the outside temperature. When the device is in use, the operator finds from experience where the outside temperature tabs should be located so as to supply the proper amount of heat for different values of outside temperature.

It has been found that the most satisfactory results are obtained by employing a motor 8 which drives the cams one revolution every four hours. With this speed of the motor the control will provide one operation of the burner every four hours when the knob 80 is in the "C" position, once every two hours when the knob is in the "B" position, and once every hour when this knob is in the "A" position. In mild weather when infrequent burner operations are desirable, the knob 80 is set at "C" which gives one operation every four hours. In cold weather frequent burner operations are desirable and the knob 80 is set to the "A" position, which gives one burner operation every hour. In intermediate weather the knob 80 is set to the "B" position, which gives one burner operation every two hours.

It is important to note that the percentage of operation as set by the knob 70 remains fixed, regardless which position the knob 80 is in. For example, if the knob 70 is set at 50% and the knob 80 is set at "A," the burner will be on one-half hour and will be off one-half hour. If the knob 80 is set at "B," the burner will be on one hour and off one hour. If the knob 80 is set at "C," the burner will be on two hours and off two hours. Inasmuch as adjustment of the knob 80 does not vary the percentage of time the burner operates, the adjustment of this knob is not critical, and thus does not affect the quantity of heat supplied. The purpose of knob 80 is simply to vary the frequency of burner operations so as to provide operations at short intervals in cold weather and at long intervals in mild weather. This operating of the burner at short intervals in cold weather keeps the radiators warm at all times and thus avoids stratification of the air in the building. In mild weather it is desirable to operate the burner only at infrequent intervals, for otherwise overheating will result. This operation of the burner at widely spaced intervals in mild weather permits the length of the operating periods to be sufficiently long to insure proper steam distribution in the building, while at the same time avoiding the necessity of operating the burner a greater percentage of time than necessary to balance the heat loss.

While a preferred embodiment of the invention has been shown and described, it is to be understood that many variations may be made without departing from the spirit and scope of the invention. It is therefore desired to be limited only by the appended claims.

What is claimed is:

1. In a periodic control, a plurality of actuating devices arranged to provide impulses of substantially the same magnitude but of different frequencies, a control device, selective motion transmitting means between the actuating devices and said control device for causing a selected one of said actuating devices to operate the control device from one control position to another, and adjusting means for bodily shifting said control device for varying the percentage of time the control device is held in one position by said actuating devices.

2. In a periodic control, a plurality of actuating devices arranged to provide impulses of substantially the same magnitude but of different frequencies, a pivotally mounted control device, a plurality of followers, one for each of said actuating devices, said followers being pivotally mounted on substantially the same axis as the control device and being arranged to actuate said control device from one control position to another, and adjusting means for moving said control device bodily about its pivot.

3. In a periodic control, a plurality of actuating devices arranged to provide impulses of substantially the same magnitude but of different frequencies, a pivotally mounted control device, a plurality of followers, one for each of said actuating devices, said followers being pivotally mounted on substantially the same axis as the control device and being arranged to actuate said control device from one control position to another, selective means for selectively rendering certain of said followers operative or inoperative to actuate said control device, and adjusting means for moving said control device bodily about its pivot.

4. In a periodic control, a plurality of cams mounted on a common shaft, means for rotating the shaft, said cams being arranged to provide impulses of substantially the same magnitude but of different frequencies, a pivotally mounted control device, a plurality of cam followers, one for each cam, said followers being pivotally mounted on substantially the same axis as the control device and being arranged to actuate the control device from one control position to another, a selector cam shaft having cam surfaces thereon arranged selectively to render certain of said followers operative or inoperative to actuate said control device, an adjusting cam, and a cam follower for the adjusting cam arranged to shift the control device about its pivot.

5. In a periodic control, a front plate, a back plate, a main cam shaft extending between said plates and carrying a plurality of cams, a motor mounted on the back plate for rotating said main cam shaft, a cam follower shaft extending between said plates, a separate cam follower for each cam pivoted on said cam follower shaft, a switch pivotally mounted on said cam follower shaft and arranged to be actuated by said cam followers, a selector cam shaft extending between the plates and having cam surfaces thereon arranged selectively to render certain of said followers operative or inoperative to actuate said switch, an adjusting cam mounted on the front of the front plate in alignment with said main cam shaft, a cam follower engaging the adjusting cam and arranged to move the switch bodily about its pivot upon rotation of the adjusting cam, and an indicator carried by the adjusting cam for indicating its adjusted position.

6. In a periodic control, a front plate, a back plate, a main cam shaft extending between said plates and carrying a plurality of cams, a motor mounted on the back plate for rotating said main cam shaft, a cam follower shaft extending between said plates, a separate cam follower for each cam pivoted on said cam follower shaft, a switch pivotally mounted on said cam follower shaft and arranged to be actuated by said cam followers, a selector cam shaft extending between the plates and having cam surfaces thereon arranged selectively to render certain of said followers operative or inoperative to actuate said switch, an adjusting cam mounted on the front part of the front plate in alignment with said main cam shaft, a cam follower engaging the adjusting cam and arranged to move the switch bodily about its pivot upon rotation of the adjusting cam, and an indicator carried by the adjusting cam for indicating its adjusted position, said indicator comprising a series of individually adjustable tabs each carrying indicia indicating a setting of the adjusting cam.

7. In a periodic control, a cam shaft, a motor for rotating said shaft, a cam carried by said cam shaft, a switch, a mounting for the switch including a pivot, a cam follower pivoted substantially in alignment with the switch mounting and arranged for actuation by said cam to operate said switch, an adjusting cam mounted in alignment with said cam shaft, and an adjusting cam follower pivoted in alignment with the switch mounting for shifting the switch about its pivot as the adjusting cam is rotated.

8. In a periodic control, a motor driven cam, an enclosed snap switch having a plunger, a mounting for the switch including a pivot, a pivoted cam follower arranged to be actuated by the cam for actuating said switch, said cam follower being mounted on the same axis as the switch mounting, a spring for biasing the cam follower toward the cam, the switch being located with respect to the cam follower in a manner to permit the spring to depress the plunger of the snap switch unless the cam follower is prevented from motion in such direction by the cam, and means for adjusting the switch about its pivot to vary the percentage of time the switch is open or closed.

9. In a control device having adjusting means, an indicator for indicating the adjustment of said adjusting means, said indicator comprising a slotted plate, a series of U-shaped tabs mounted on the plate, the legs of each tab being on opposite sides of the plate with the central portion extending through the slot, indicia carried by said tabs, and a transparent cover covering a portion of said plate and said tabs, said cover protecting the tabs and providing friction for holding the tabs in adjusted position.

10. In a periodic control, a motor driven cam, a switch having an operating member, a mounting for the switch including a pivot, a pivoted cam follower arranged to be actuated by the cam for actuating said switch, said cam follower being mounted on the same axis as the switch mounting, a spring for biasing the cam follower toward the cam, the switch being located with respect to the cam follower in a manner to permit the spring to actuate the operating member for the switch unless the cam follower is prevented from motion in such direction by the cam, and means for adjusting the switch about its pivot to vary the time the switch is open or closed.

WAYLAND R. MILLER.

REFERENCES CITED

The following references are of record in the file of this patent:

UNITED STATES PATENTS

| Number | Name | Date |
| --- | --- | --- |
| 1,370,747 | Ide | Mar. 18, 1921 |
| 1,783,375 | Butler | Dec. 2, 1930 |
| 2,234,375 | Kronmiller | Mar. 11, 1941 |
| 2,274,371 | Kucera | Feb. 24, 1942 |
| 2,279,107 | Cahn | Apr. 7, 1942 |
| 2,371,378 | Clark | Mar. 13, 1945 |
| 2,373,186 | Isserstedt | Apr. 10, 1945 |